US012806662B2

(12) United States Patent
Silva E Martins et al.

(10) Patent No.: US 12,806,662 B2
(45) Date of Patent: Nov. 24, 2026

(54) SAFETY SYSTEM AND METHOD FOR HYDRO JETTING GUNS

(71) Applicants: PETRÓLEO BRASILEIRO S.A.—PETROBRAS, Rio de Janeiro (BR); SERVIÇO NACIONAL DE APRENDIZAGEM INDUSTRIAL—DEPARTAMENTO REGIONAL DE MINAS GERAIS SENAI—MG/SENAI CIT, Belo Horizonte (BR)

(72) Inventors: Mateus Silva E Martins, Belo Horizonte (BR); Bertrando Ribeiro Rabelo, São José dos Campos (BR); Marcos Vinícius Do Espírito Santo, Belo Horizonte (BR); Herculano Braulio Carlquist Silva, Rio de Janeiro (BR); Ana Luísa Evaristo Rocha Petrini, Belo Horizonte (BR); Luciano Do Valle Garotti, Rio de Janeiro (BR); Andre Koebsch, Rio de Janeiro (BR); Júlio Cézar De Alvarenga Pires, Belo Horizonte (BR); Paulo Henrique Giusti, São José dos Campos (BR); Cesar Luiz Silva, São José dos Campos (BR); Wesley Cecilio Silva, Belo Horizonte (BR); Júlio Sérgio Alves, Belo Horizonte (BR); Vinicius Lopes Da Silva, Belo Horizonte (BR); Jorge Augusto Costa Junior, Belo Horizonte (BR); Max Baranenko Rodrigues, Belo Horizonte (BR); Paulo Henrique Paiva Gonzaga, Belo Horizonte (BR); Marcus Vinicius De Paula, Belo Horizonte (BR); Hernane Do Bom Sucesso Xavier Moreira, Belo Horizonte (BR); João Henrique Rodrigues Costa, Belo Horizonte (BR)

(73) Assignees: PETRÓLEO BRASILEIRO S.A.—PETROBRAS, Rio de Janeiro (BR); SERVIÇO NACIONAL DE APRENDIZAGEM INDUSTRIAL—DEPARTAMENTO REGIONAL DE MINAS GERAIS SENAI—MG/SENAI CIT, Belo Horizonte (BR)

( * ) Notice: Subject to any disclaimer, the term of this patent is extended or adjusted under 35 U.S.C. 154(b) by 176 days.

(21) Appl. No.: 18/961,015

(22) Filed: Nov. 26, 2024

(65) Prior Publication Data

US 2025/0178041 A1 Jun. 5, 2025

(30) Foreign Application Priority Data

Nov. 30, 2023 (BR) .......................... 1020230251714

(51) Int. Cl.
*B08B 3/02* (2006.01)

(52) U.S. Cl.
CPC ...... *B08B 3/028* (2013.01); *B08B 2203/0282* (2013.01)

(58) Field of Classification Search
CPC ...................................................... B08B 3/028
See application file for complete search history.

(56) References Cited

FOREIGN PATENT DOCUMENTS

| | | | |
|---|---|---|---|
| BR | PI0901337 | A2 | 4/2011 |
| BR | 202014012800 | U2 | 12/2015 |

*Primary Examiner* — Jason Y Ko
(74) *Attorney, Agent, or Firm* — Troutman Pepper Locke LLP

(57) ABSTRACT

A safety system and method for hydro jetting guns capable of monitoring and interrupting a hydro jetting operation depending on movements detected out of predefined oper- (Continued)

ating limits. In particular, the system described herein can include a gun adaptation assembly interconnected to a pressure and power box, and comprising at least two inertial measurement sensors, a support with a gun microcontroller, and a double trigger mechanism. The pressure and power box is provided with a junction box and a solenoid valve. The system can further include a user monitoring wearable. If a deviation from pre-established standards is detected that suggests malfunction, excessive working hours, and/or discomfort of an operator, the system acts immediately to interrupt the hydro jetting operation and ensure the safety of those involved.

20 Claims, 10 Drawing Sheets

SAFETY SYSTEM AND METHOD FOR HYDRO JETTING GUNS

CROSS-REFERENCE TO RELATED APPLICATIONS

The present application claims the benefit of Brazilian Patent Application No. BR1020230251714, filed Nov. 30, 2023, the entire contents of which are fully incorporated herein by reference.

Field of the Application

The present invention pertains to the field of processes applicable to cleaning and/or removing paints or other resistant coatings placed on surfaces, processes related to hydro jetting, spraying, or cleaning through the use of jet force in general.

State of the Art

Currently, the processes of cleaning and/or removing paints or other surface coatings using ultra-high-pressure water jets are performed by purely pneumatically driven hydro jetting guns. Despite training, strict safety protocols for using the equipment and use of PPE (Personal Protective Equipment) appropriate for the activity, there is a possibility of serious accidents. These accidents can be caused by situations of imbalance, discomfort, the appearance of another operator in the hydro jetting area or even the operator's lack of attention, since there are no control and automation devices in the gun capable of detecting dangerous situations and acting on the equipment immediately and effectively.

The ultra-high-pressure water jet, when in contact with human tissues, can cause injuries, amputations of limbs or, in more serious cases, death to the operator. Currently, to ensure operator safety, it is recommended that the operator undergo training and follow safety protocols in order to standardize the operation. Additionally, the use of appropriate PPE prevents some types of injuries in the event of contact of the high-pressure water jet with parts of the operator's body.

A review of publications available in the state of the art is presented below.

Patent document BR202014012800U2 describes construction arrangements introduced in safety clothing for hydro jetting operations at very high pressures, aiming at protecting the operator and assistants against accidents through construction and functional improvements with a facial and hearing protection kit, and a hood with chest and shoulder protectors. Patent document BRPI0901337A2 describes a set of clothing made of waterproof fabric resistant to very high pressures, aiming at protecting the user against involuntary exposures of up to 40,000 psi or 2,800 bar (280 MPa). Said set consists of a hood with a visor for head protection including eyes, face and neck, a sleeveless vest-type jacket for frontal torso protection, a pair of upper sleeves for shoulder pads for arm protection, a pair of lower sleeves for forearm protection, pants for frontal leg protection, and a pair of leggings for use over safety boots.

BRIEF DESCRIPTION OF THE INVENTION

The present invention relates to a safety system for hydro jetting guns capable of monitoring and interrupting a hydro jetting operation depending on movements detected out of predefined operating limits, said system comprising at least: a gun adaptation assembly interconnected to a pressure and power box, and comprising at least two inertial measurement sensors, a support with a microcontroller, and comprising a double trigger mechanism; wherein said pressure and power box is provided with a junction box and a solenoid valve; and a user monitoring wearable.

The gun adaptation assembly is interconnected to the pressure and power box by one or more wires, wherein both the gun adaptation assembly and the pressure and power box are made of metallic material. Furthermore, the microcontroller is interconnected to the user monitoring wearable, e.g., by wireless communication.

In short, the gun adaptation assembly is capable of being connected to one or more hydro jetting guns, via at least three gripping components capable of embracing the entire longitudinal extension of the gun.

In some embodiments of the invention, the pressure and power box additionally comprises an information display.

In some embodiments described herein, the at least two inertial measurement sensors are connected by one or more wires to the gun microcontroller, wherein said sensors can comprise gyroscopes and accelerometers. Control instructions for the system actions are stored in the microcontroller, where the system actions are selected from parameters, start and stop of operation and display of information.

In particular, the junction box distributes electrical energy to power the solenoid valve and the display, and the solenoid valve releases, or not, a flow of compressed air to trigger the hydro jetting operation. Said solenoid valve is powered by 24 V direct voltage, with a pressure prediction in the pneumatic line, for example, between approximately 2 and 8 bar (200 and 800 kPa), and a size compatible to allow its accommodation in the pressure and power box. In turn, said junction box can be manufactured so that its technical characteristics are compatible and allow its coupling to the pressure and power box and its volume is small enough to be accommodated in the same pressure and power box.

Through the use of the double trigger mechanism, the present invention limits operation only by actuating both triggers simultaneously, said double trigger mechanism comprising, in the invention, electronic and pneumatic driving. After the triggers are actuated, an electronic signal is sent to the microcontroller that releases the operation, turning on the solenoid valve. If one of the triggers is released, the equipment turns off.

In some embodiments, the user monitoring wearable comprises battery-powered heart rate detection sensors. The sensors of the user monitoring wearable, in addition to the inertial measurement sensors, are read and recognized by the gun microcontroller, which communicates the necessary actions to the pressure and power box. This entire system is capable of externalizing data related to the operational environment via wireless through the arrangement and configuration of a Wi-Fi connection module in the gun microcontroller.

Additionally, the present invention comprises a safety method for hydro jetting guns, of the method including the assembly phase in the hydro jetting gun and the operation phase of this hydro jetting gun, with the objective of monitoring and interrupting a hydro jetting operation depending on movements detected out of predefined operating limits. The aforementioned method and its phases comprise, at least, the following steps:

Phase 1—Assembly in the Hydro jetting Gun

Step A) Installation of the pressure and power box

Step B) Installation of the gun adaptation assembly

Step C) Interconnection between the pressure and power box and the gun adaptation assembly Phase 2—Operation of the Hydro Jetting Gun Step D) User registration Step E) Dry testing Step F) Hydraulic connection Step G) Hydraulic testing Step H) Connection of the system Step I) Release for operation Step J) Safety monitoring Step K) Safety blocking In particular, Step A) includes physically installing the solenoid valve, the junction box and the display in the pressure and power box, as well as interconnecting the aforementioned display and the aforementioned solenoid valve by wire via the junction box.

Step B) includes physically installing the double trigger mechanism in the gun adaptation assembly, as well as physically installing the microcontroller in the gun adaptation assembly and, finally, interconnecting the double trigger mechanism to the microcontroller by wire.

Step C) includes interconnecting the microcontroller to the display by wire through the junction box.

In turn, Step D) involves registering the wearable, defining a user in a determined operating environment, as well as a gun for this environment, wherein, once registered, the wearable is turned on and placed on the user.

In Step E), a dry testing of the system is performed.

Step F) includes making the connections with the hydraulic lines to be used.

Step G) includes testing the hydraulic connections.

In Step H), the system is finally energized, and a light indicating operation may be activated.

In Step I), the system is released for operation, so that the actuation of the two triggers of the double trigger system 8 releases the hydro jetting operation.

Step J) includes a series of safety monitoring procedures, selected from: monitoring the gun movement conditions using the inertial measurement sensors; monitoring the double trigger mechanism actuation conditions; monitoring the hydro jetting activity time; and/or monitoring the user in activity using the wearable.

Step K) includes a series of safety blocking options, immediately activated upon deviation from the predefined patterns and monitored in Step J), selected from: automatic interlocking of the water flow, using the solenoid valve, in the event of a movement out of the standard detected by the inertial measurement sensors; automatic interlocking of the water flow, using the solenoid valve, in the event of one of the triggers of the double trigger mechanism being turned off; automatic interlocking of the water flow, using the solenoid valve, if the activity time limit is exceeded; and/or automatic interlocking of the water flow, using the solenoid valve, in the event of loss of communication between the wearable and the gun adaptation assembly.

DETAILED DESCRIPTION OF THE INVENTION

Figure 1:
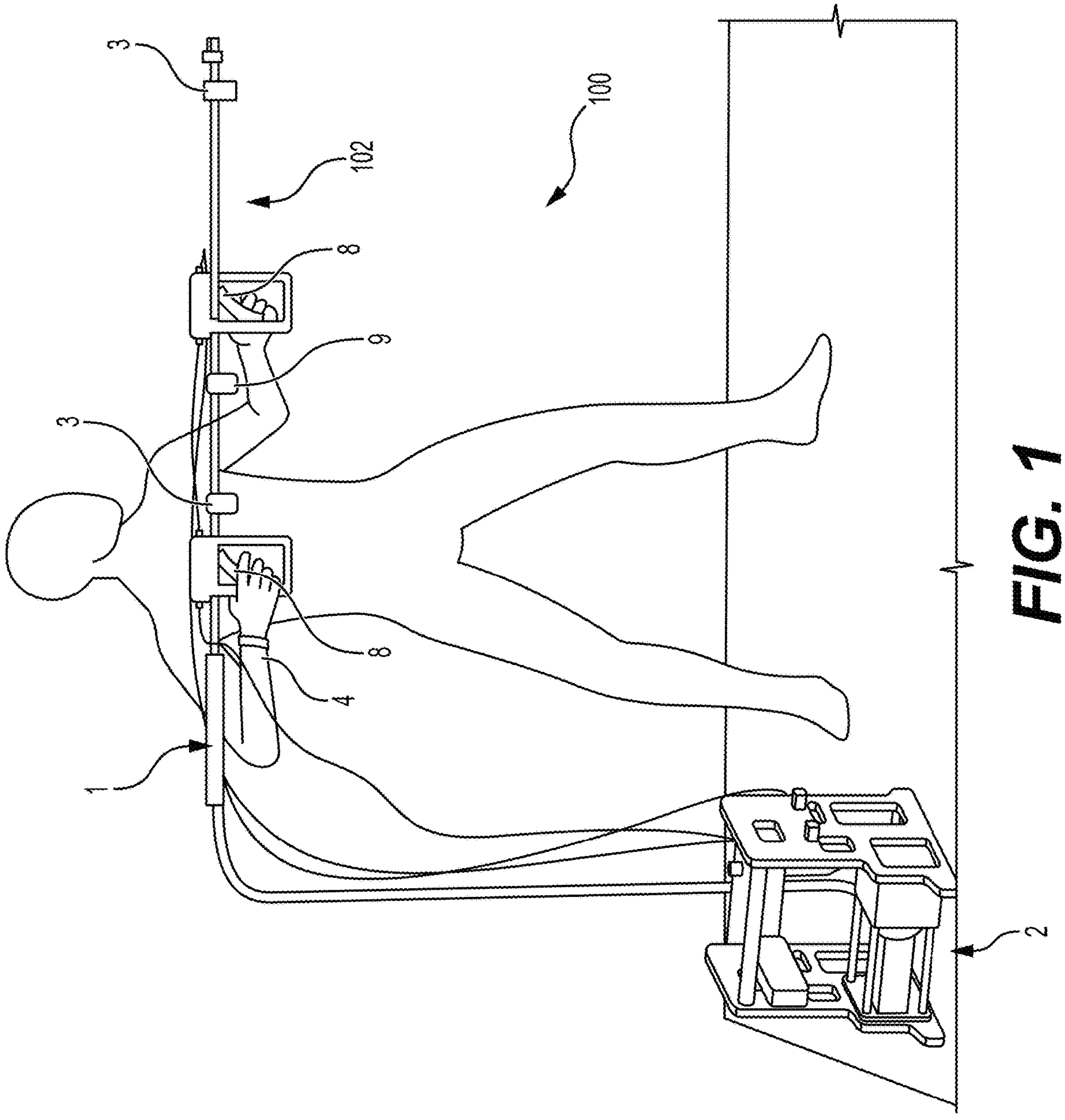
FIG. 1 is a graphic representation of the safety system for hydro jetting guns, wherein it is possible to visualize an operator in positioning for use of the system, with a hydro jetting gun coupled to the gun adaptation assembly, duly interconnected by wire connection to the pressure and power box.

Traditional systems and methods for hydro jetting guns provide no safety equipment installed in the gun to signal and/or abort the hydro jetting operation in the event of risky situations. It is up to the operator to identify these situations, when possible, and turn off the equipment, in an attempt to avoid incidents and/or accidents. For example, in hydro jetting systems operated by two people, there is the figure of the “guardian angel” (operator responsible for turning the water pressure pump on and off). In this case, this operator also identifies possible abnormalities in the process and acts on the operation, signaling and/or aborting the activity in case of risk to the gun operator.

Although some efforts have been directed to improve safety measures in hydro jetting operations, there are currently no control and automation systems and methods in the gun itself that are capable of detecting dangerous situations and acting on the equipment immediately and effectively. Further, there are no mechanisms available that act directly to interrupt the operation of hydro jetting guns once any misalignment of the safety conditions is identified. Thus, to solve the deficiencies of traditional systems and methods, the present invention provides systems and methods that interrupt the hydro jetting process depending on movements out of the operational limits defined by a set of instructions embedded in a digital storage medium. To this end, the physical quantities monitored in the gun include the acceleration in the x, y and z directions, the vertical and horizontal angles of the gun in relation to the direction of actuation of the water flow, and the angle of the axis of the gun handle. Consequently, situations of imbalance or misdirection of the water flow can be avoided.

The systems and methods proposed in the present invention are also capable of interrupting the hydro jetting process if one of the triggers (of a double trigger system) of the gun stops being actuated. Furthermore, the systems and methods described herein require the operator to press both triggers simultaneously for the water flow to begin. This restriction ensures that the equipment will be handled with both hands throughout the activity. This type of mechanism allows the operator to have greater control over the direction of the pressurized water flow.

Furthermore, the systems and methods described herein control the performance of each operator by means of an operating time limit and by capturing their heart rate. The systems and methods are capable of interrupting the operation when the service time is reached. In this way, risky situations are avoided due to fatigue caused by working hours longer than the safe time defined for the activity, for example, usually 1 (one) hour.

The present invention initially relates to a safety system for hydro jetting guns used for cleaning surfaces and/or removing paints and other adherent coatings, in environments such as steel mills, oil and gas companies, mining companies, cement companies, civil construction, among others. Through the system described in the present invention, it is possible to monitor and interrupt a hydro jetting operation depending on movements detected out of predefined operating limits by using an intelligence mechanism, such as a memory storing instructions, a microcontroller, etc. In this sense, for example, if a shift in pre-established standards and/or parameters is detected that suggests malfunction, excessive working hours or discomfort on the part of an operator, the system acts immediately, interrupting the hydro jetting operation and ensuring the safety of those involved.

In particular, the system of the present invention is specially designed to be attachable to one or more hydro jetting guns. To this end, the coupling of the proposed system to a hydro jetting gun must only take into account the compatibility of installation of sensors, especially in the rear trigger region; the diameter of the fitting in the gun lance; and the capacity to couple batteries to the region of the gun and also to the pressure and power box. If size adjustments are necessary to use a larger or smaller gun, these size adjustments will still be performed while maintaining the principles disclosed in this document, therefore, within the scope of the present invention. To this end, adapters can be used to resize the diameter of the housings of the adaptation assembly (couplings) of the gun lance and the housings of the pressure and power box. It is necessary that the geometry of the trigger has the dimension and predisposition to adapt the support of an electronic key.

In order to fully describe the object of the invention, the systems and the methods disclosed herein will be presented below, with reference to FIGS. 1 to 10. From said figures, it is understood that the safety system for hydro jetting guns 100 comprises a gun adaptation assembly 1, interconnected by one or more wires to a pressure and power box 2. Said gun adaptation assembly 1 comprises at least two IMU (Inertial Measurement Unit) Sensors 3, has support for at least one Gun Microcontroller 9, and comprises a Double Trigger Mechanism 8. In turn, the pressure and power box 2 is interconnected by wires to the gun adaptation assembly 1 and connects via wireless to a User Monitoring Wearable 4. Additionally, said pressure and power box 2 comprises an information display 5, a junction box 6 and a Solenoid Valve 7.

Figure 2:
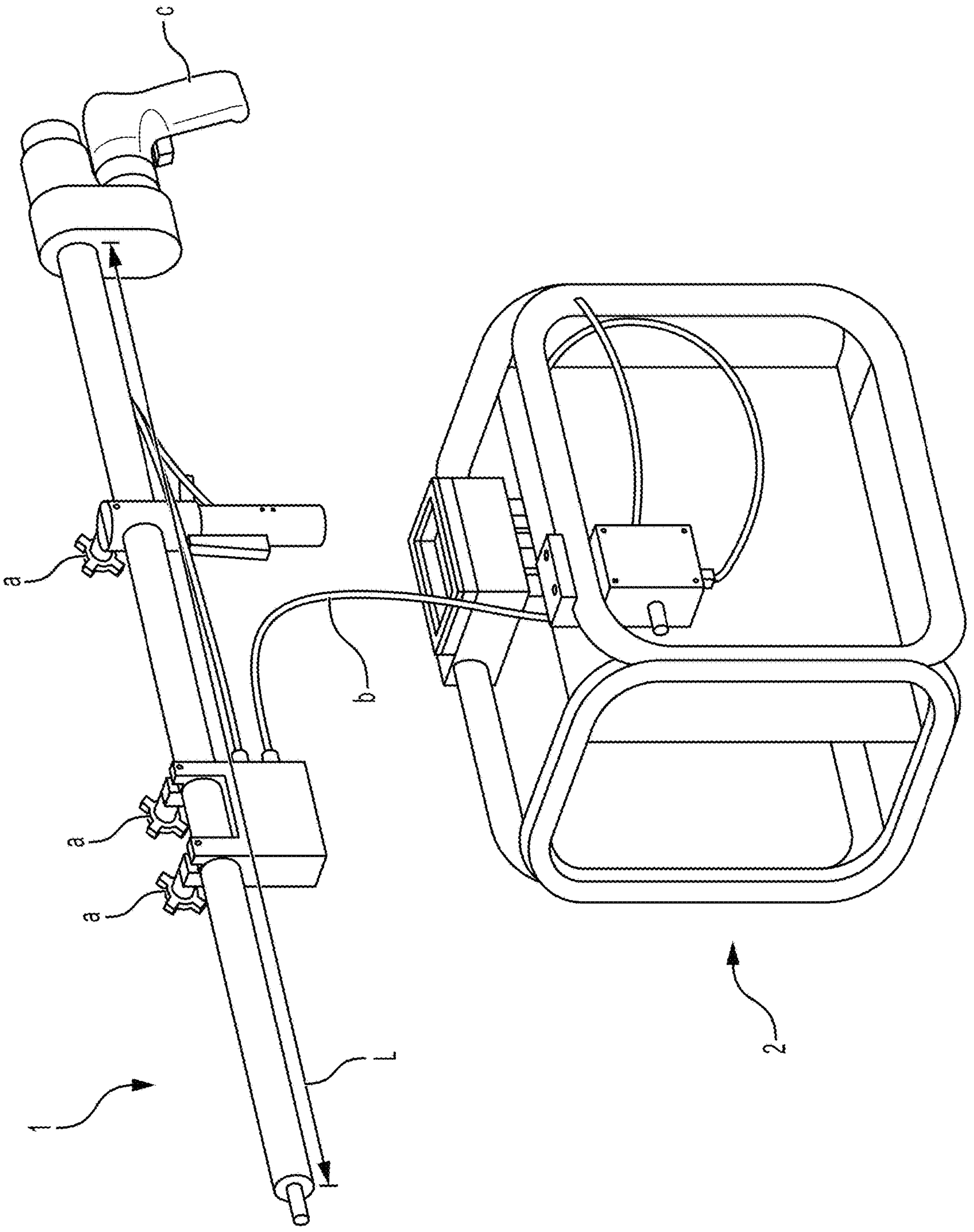
FIG. 2 is a representative diagram of the two main portions of the system of the present invention, precisely the gun adaptation assembly and the pressure and power box, now without the operator in positioning for use.

FIG. 1 is a graphical representation of the safety system 100 for hydro jetting guns, wherein it is possible to visualize an operator in the position to use the system, with a hydro jetting gun 102 already attached to the gun adaptation assembly 1, duly interconnected by wire connection to the pressure and power box 2. As shown in FIG. 1, it is possible to observe that the system proposes that the user dedicate both hands during the hydro jetting operation. Precisely, the system interrupts the hydro jetting process if one of the triggers of the trigger mechanism 8 stops being actuated. Furthermore, it requires the operator to actuate both triggers 8 simultaneously for the water flow to be initiated. Through this restriction, it can be ensured that the equipment will be handled with both hands throughout the activity. This gives the operator greater control over the direction of the pressurized water flow Also from FIG. 1, it is possible to observe the positioning of at least two IMU sensors 3, which are also connected by wires to the microcontroller 9 of the gun adaptation assembly 1. The IMU sensors 3 comprise inertial measurement units consisting of gyroscopes and accelerometers, and are responsible for detecting the acceleration and position of the hydro jetting gun 102. Meanwhile, the instructions capable of controlling the actions of the system 100 are stored in the microcontroller 9, in relation to parameters, start and stop, display of information, etc. FIG. 2 is a representative diagram of the two main portions of the system 100 of the present invention, precisely, the gun adaptation assembly 1 and the pressure and power box 2, now without the operator in a position to use the same and still without the hydraulic and pneumatic interconnection of these parts. FIG. 2 illustrates how to precisely and safely attach a hydro jetting gun to the system of the invention. Precisely, a gripping component ‘a’ can be visualized, being at least three, capable of embracing the entire longitudinal extension L of the gun, in a fixed manner during use. The gripping component ‘a’ can be, for example, screw handles, providing a convenient way to tighten or loosen the housing of the adaptation assembly manually, without the need for specific tools, such as screwdrivers or wrenches. Screw handles are especially useful in situations where the housings need to be adjusted frequently or when the application of tools would make the adjustment inefficient.

Furthermore, a handle ‘c’ compatible with the rear trigger of the hydro jetting gun to be used can be seen. Finally, FIG. 2 shows the wire connection ‘b’ between the gun adaptation assembly 1 and the pressure and power box 2.

It is important to note that the entire structure of the system 100 proposed herein is metallic. In terms of dimensions, one of ordinary skill in the art would understand that the applicable measurements are the conventional measurements that apply to commercially available hydro jetting guns. If size adjustments are necessary to use a larger or smaller gun, these size adjustments will still be performed while maintaining the same principles disclosed in this document, therefore, within the scope of the present invention.

Figure 3:
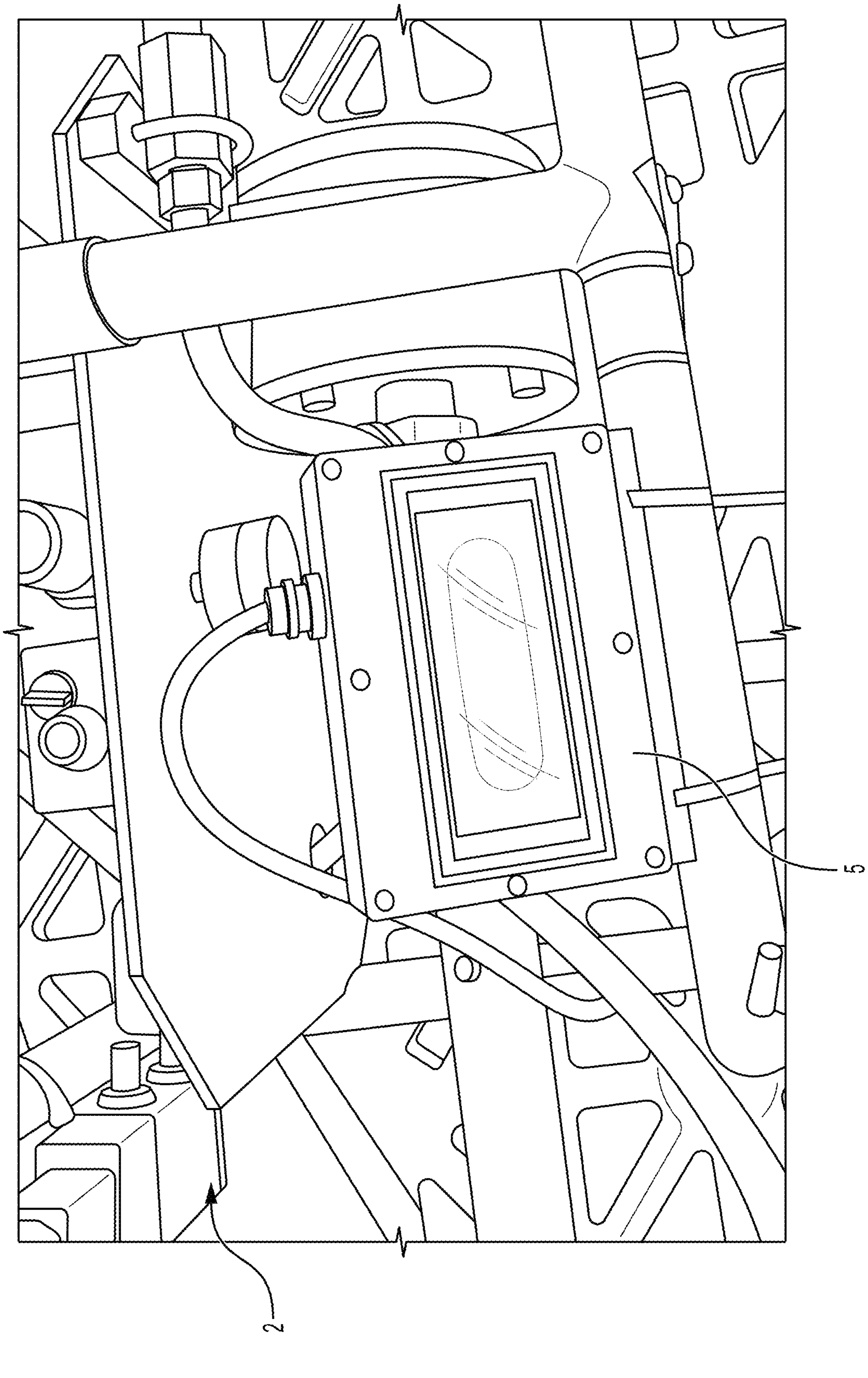
FIG. 3 is a photograph highlighting the pressure and power box of the system of the invention, detailing the display.

FIG. 3 illustrates the pressure and power box 2 of the system 100 of the invention, detailing the display 5. Said display 5 has the function of informing an operator (main, or, optionally, an assistant operator) whether the system is in operation or whether some safety condition has been activated to interrupt the flow of water. Therefore, the display 5 is configured to display operational information of the system 100. Due to the particularities of the operating environment, said display 5 can display other details read by a memory of an intelligence mechanism (memory with instructions, microcontroller, etc.) operating with the system, such as, for example, specific parameters of temperature, time, pressure, specificity of the hydro jetting, etc.

Figure 4:
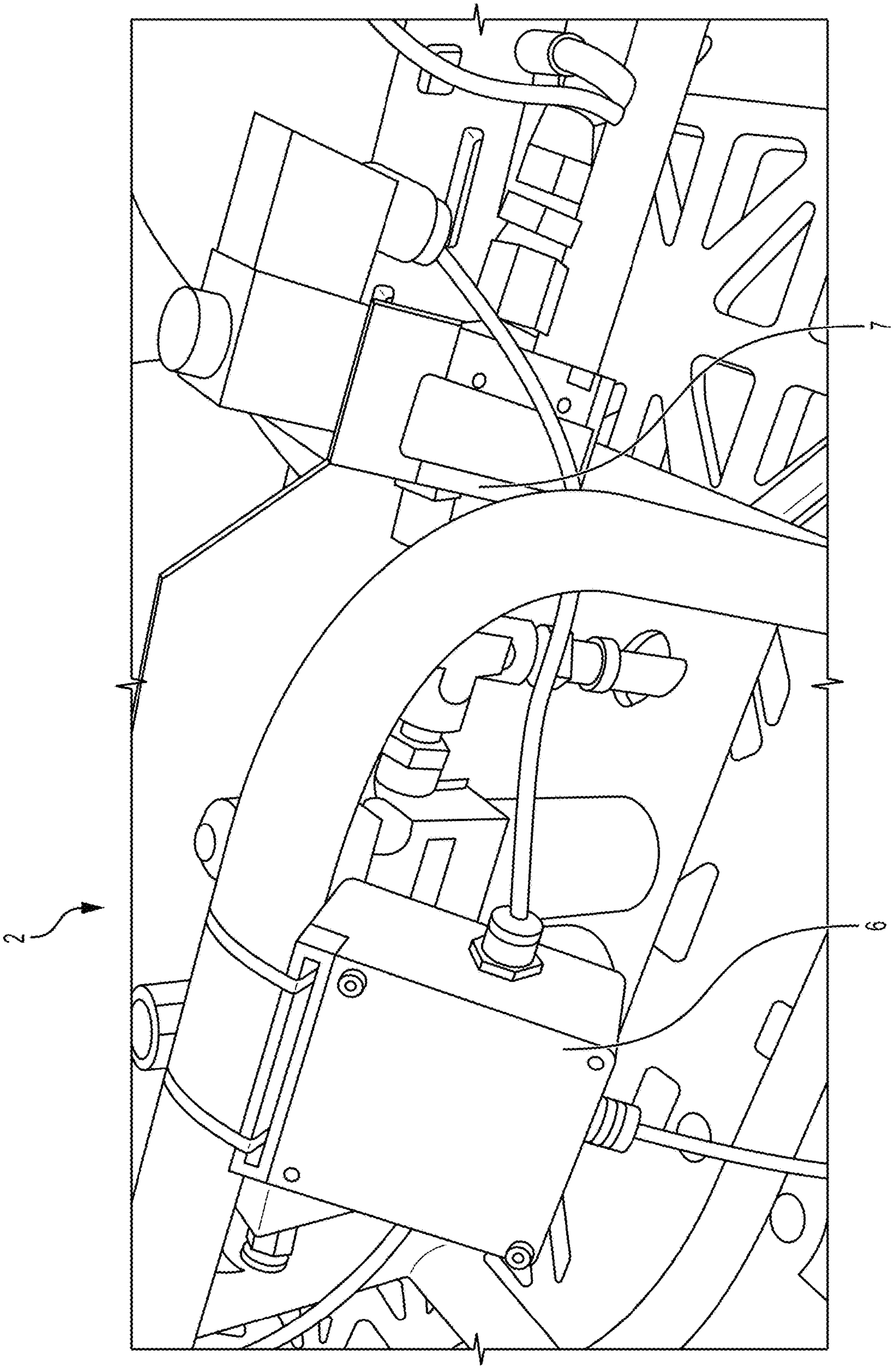
FIG. 4 is a photograph highlighting the pressure and power box of the system of the invention, detailing the junction box and the solenoid valve.

FIG. 4 illustrates the pressure and power box 2 of the system 100 of the invention, detailing the junction box 6 and the solenoid valve 7. The solenoid valve 7 to be used can be powered by 24 V direct voltage, having the function of releasing (or not) a flow of compressed air to drive the gun. Among its technical specifications, the pressure in the pneumatic line can be between approximately 2 and 8 bar (200 and 800 kPa), and its size, which must be small enough to allow its accommodation in the pressure and power box 2. The junction box 6, in turn, has the function of distributing electrical energy to power the solenoid valve 7 and the display 5 of the pressure and power box 2. The junction box 6 can be manufactured so that its technical characteristics are compatible to allow its coupling to the pressure and power box 2 and its volume is small enough to be accommodated in the same pressure and power box 2.

Figure 5:
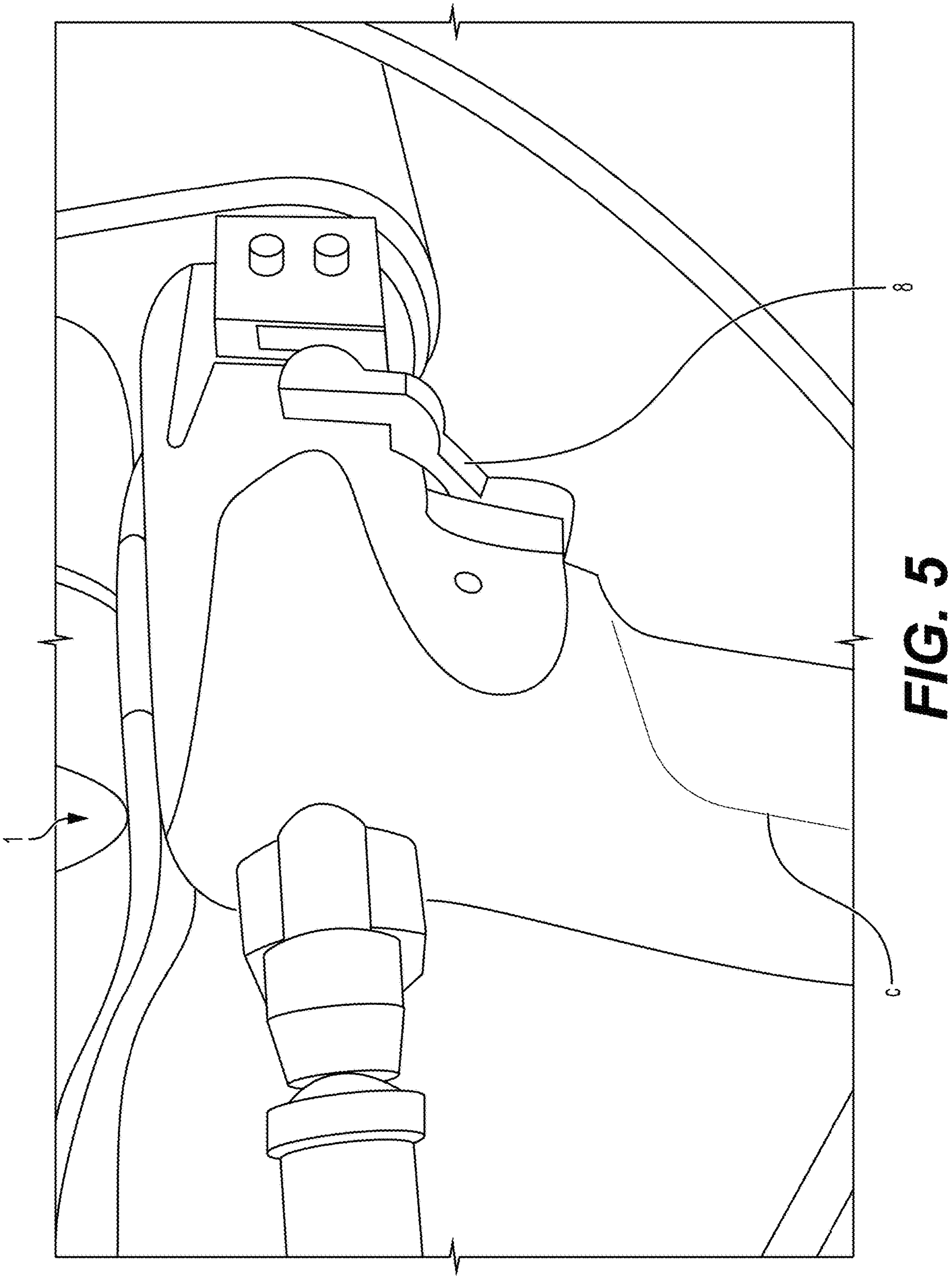
FIG. 5 is a photograph highlighting the gun adaptation assembly of the system of the invention, with a hydro jetting gun already attached, detailing at least part of the double trigger mechanism.

FIG. 5 illustrates the gun adaptation assembly 1 of the system 100 of the invention, with a hydro jetting gun already coupled, detailing at least part of the double trigger mechanism 8, which is precisely the one located in the region of the handle 'c'. In the double trigger mechanism of traditional equipment, the actuation occurs purely pneumatically. In the invention described herein, however, the mechanism is actuated both electronically and pneumatically. The additional electronic actuation occurs through electronic switches arranged in each of the triggers that make up the mechanism 8.

Figure 6:
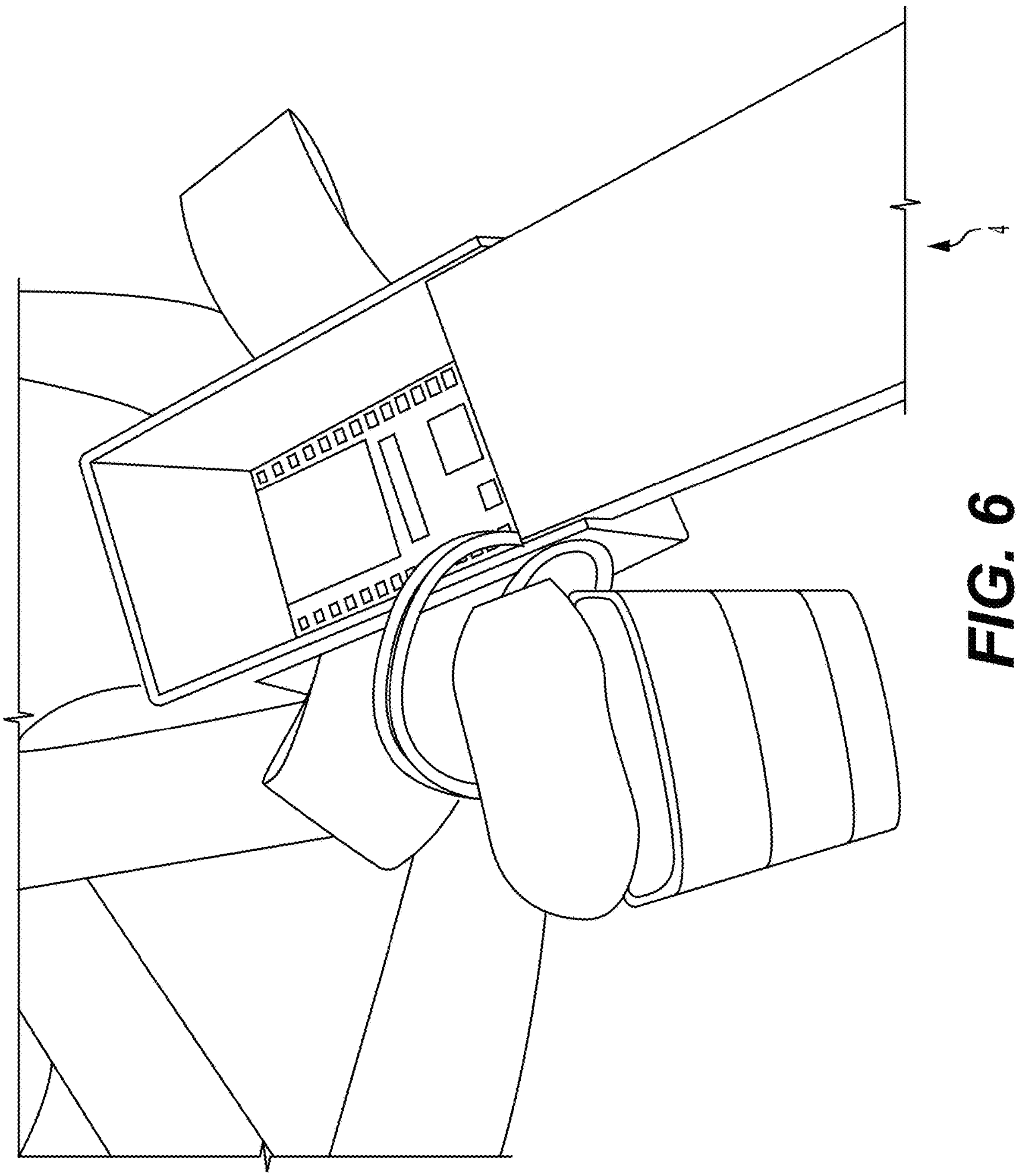
FIG. 6 is a photograph highlighting the user monitoring wearable, in disassembled condition, of the system of the invention, detailing an example of a power supply.

FIG. 6 illustrates the user monitoring wearable 4, in disassembled condition, of the system 100 of the invention, detailing an example of a power supply. The sensors that detect the good condition of the operator are arranged in said user monitoring wearable 4. For example, there can be arranged heart rate detection sensors, among others, that are suited to the specificity of that particular hydro jetting operation. By adding the data from these sensors of the user monitoring wearable 4 with the data obtained from the IMU sensors 3 available in the gun adaptation assembly 1, a greatly improved safety is achieved by the system. Any variations detected at these two points are promptly recognized by the gun microcontroller 9 and communicated to the pressure and power box 2, immediately terminating the operation in the event of anomalies.

Figure 7:
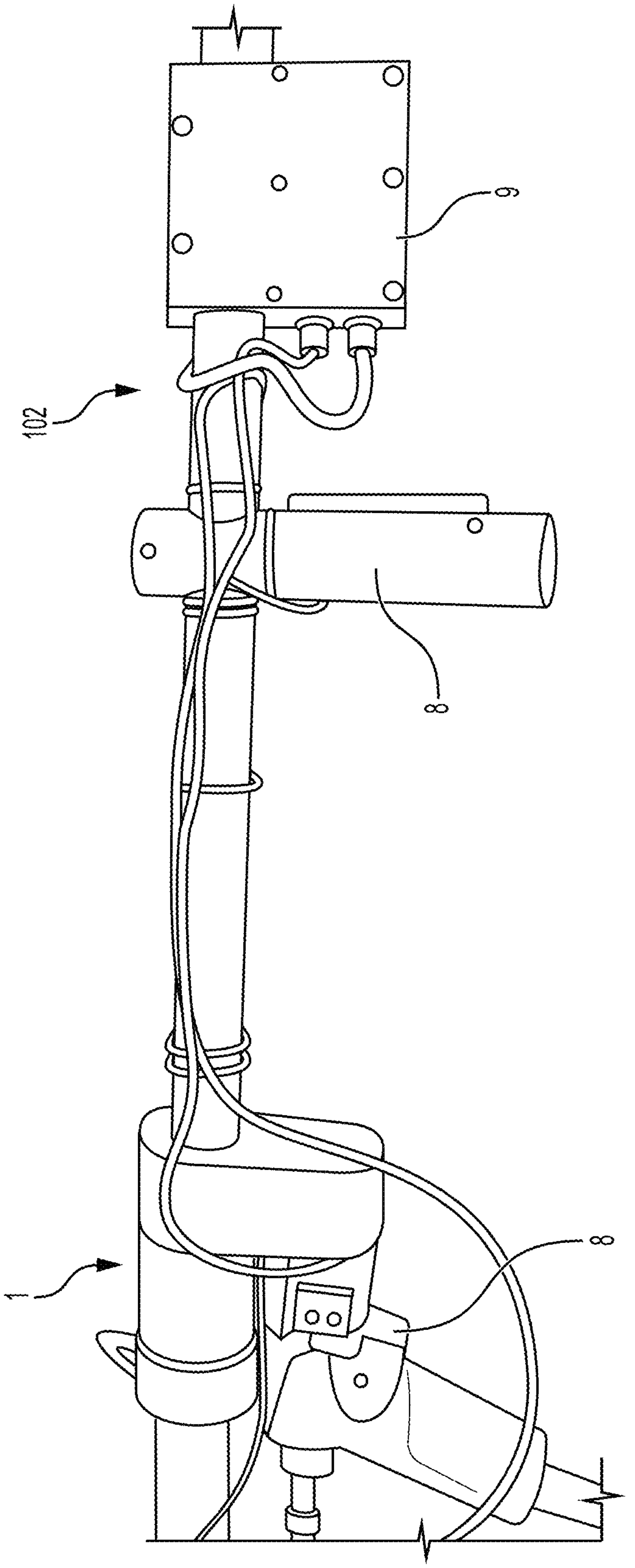
FIG. 7 is a descriptive photograph of the gun adaptation assembly, with a hydro jetting gun already attached, wherein it is possible to observe the double trigger mechanism and the microcontroller of the gun adaptation assembly.

FIG. 7 illustrates the gun adaptation assembly 1, with a hydro jetting gun 102 already attached, wherein it is possible to observe the double trigger mechanism 8 and the microcontroller 9 of the gun adaptation assembly. It should be noted that double trigger systems are conventionally provided for in hydro jetting guns, but, however, their actuation originally occurs purely pneumatically. Differentially, in the present invention the system is both electronically and pneumatically driven. After the triggers are simultaneously actuated, an electronic signal is sent to the microcontroller 9 that releases the operation, turning on the solenoid valve 7. If one of the triggers is released, the proposed system is immediately turned off. Only by applying the present invention is it possible to monitor and act on movements, aborting the operation in the event of risk, in a precise, assertive and immediate way.

Figure 8:
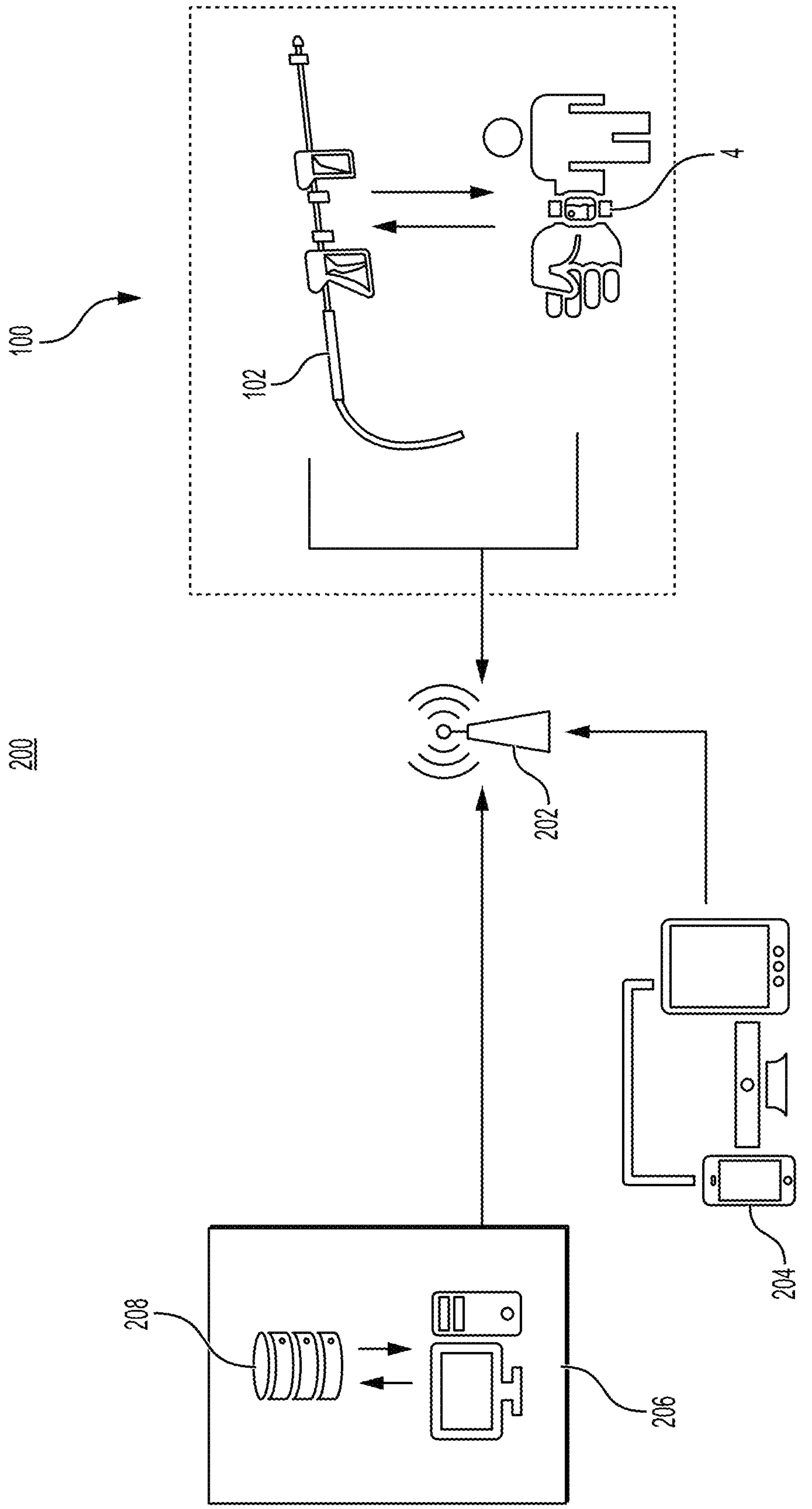
FIG. 8 is a representative diagram of an operating environment with the system of the invention in use and the ability to externalize data related to this operating environment, via wireless.

FIG. 8 is a representative diagram of an operating environment 200 with the system 100 of the invention in use and the ability to externalize data related to this operating environment, via a wireless network (e.g., Wi-Fi). Therefore, it can be noted that the system 100 in relation to its components works by communicating via wires (except for the wearable 4). However, in environments where it is desired to store data from this operation, create a data file, or even act on the predefined parameters for a given operation, embodiments of the invention are provided for in which a wireless (e.g., Wi-Fi) router 202 is used to connect system 100 to, for example, a responsive and/or multiplatform backend system 204, a local or cloud server 206, and/or a database 208. These components can be connected via a private or publica network. In this example, the microcontroller 9 of the gun adaptation assembly already stores a Wi-Fi connection module, so that it is possible to externalize information about the operation. The adaptation of a Wi-fi router in communication with the microcontroller 9 of the gun adaptation assembly and other possible intelligence and memory mechanisms applicable to the system 100 are included in the scope of the invention described herein.

Figure 9:
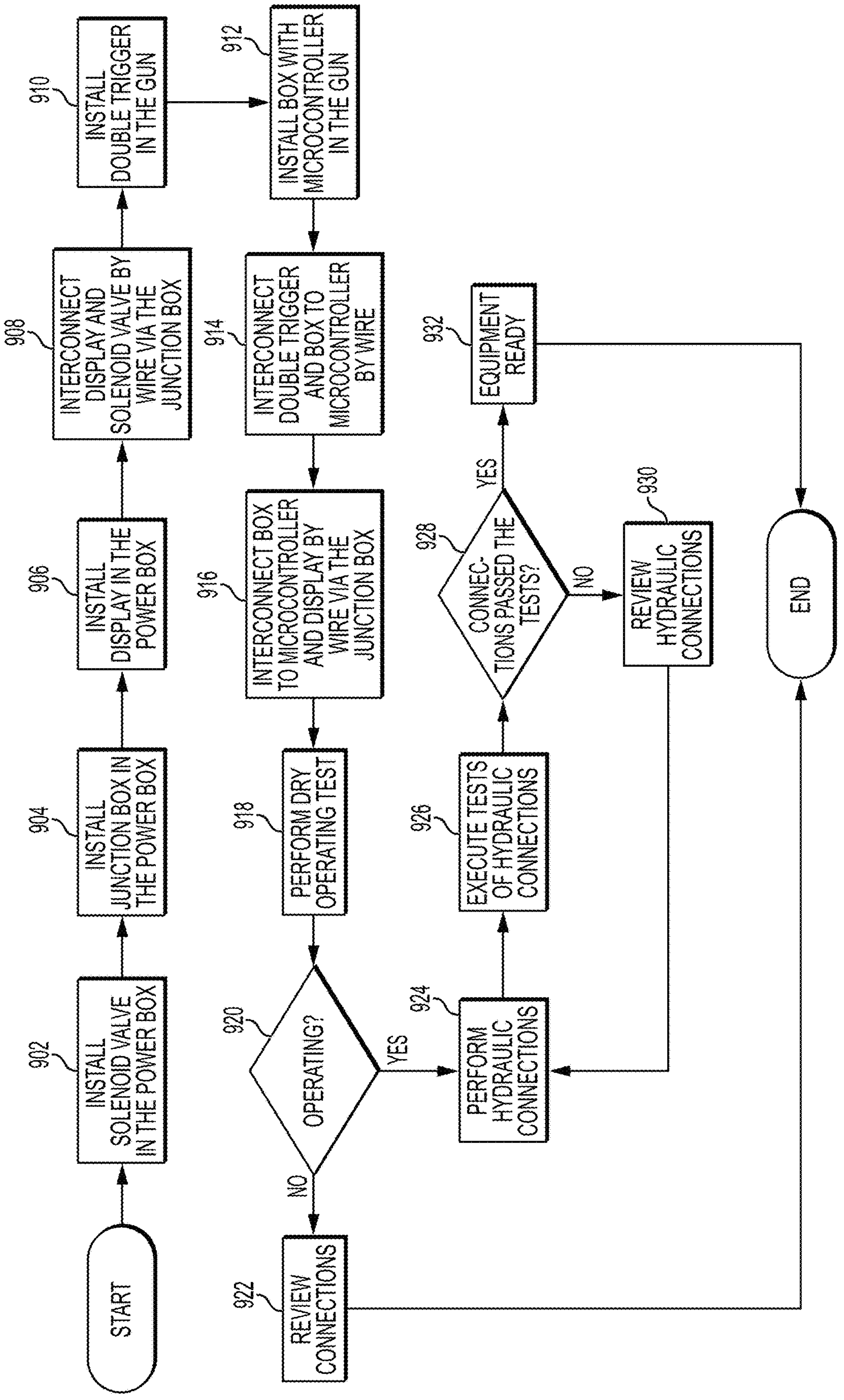
FIG. 9 is a representative flowchart of Phase 1 of the Method, referring to the assembly of the safety system for hydro jetting guns, described in the present invention.
Figure 10:
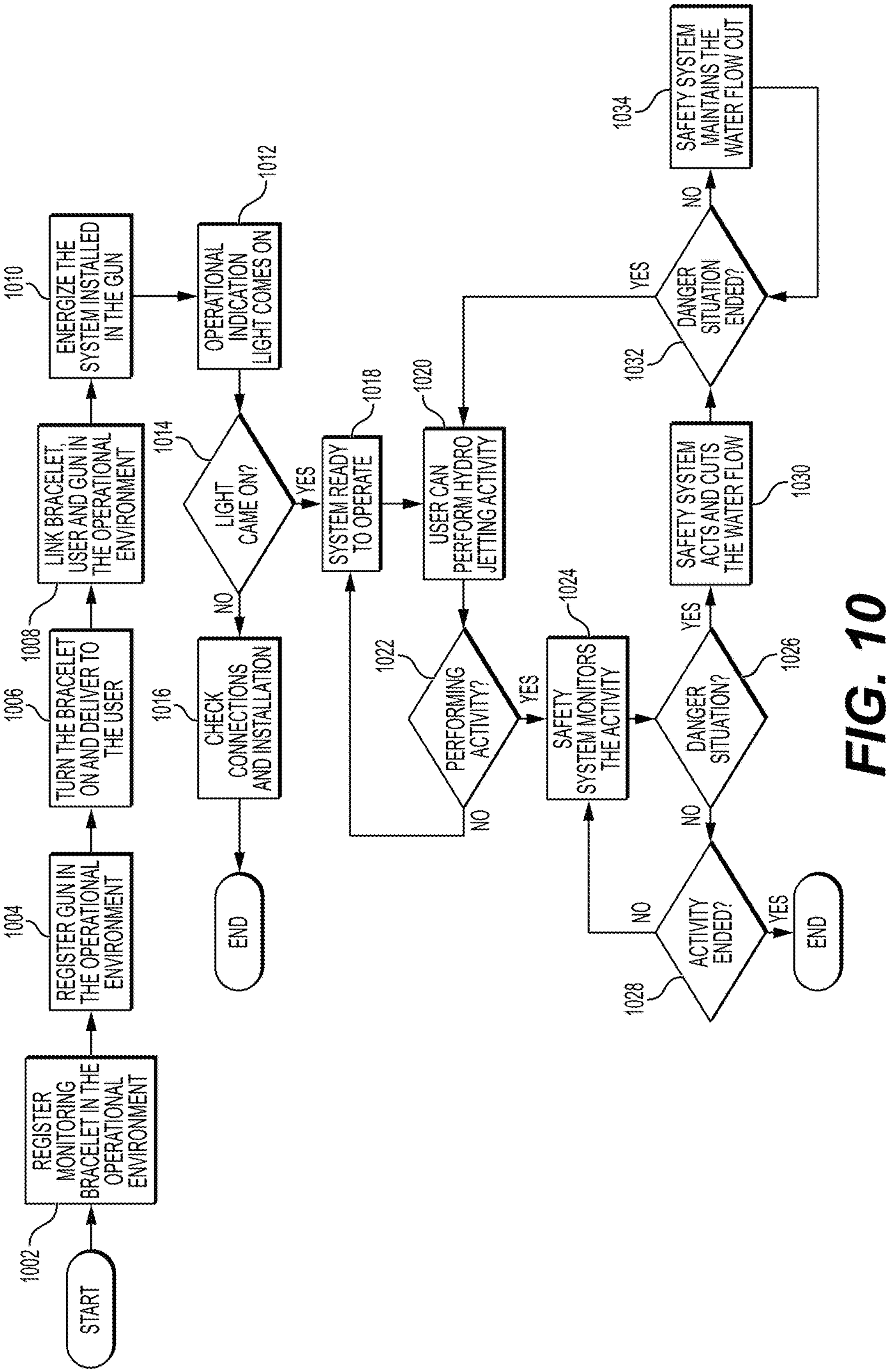
FIG. 10 is a flowchart representing Phase 2 of the Method, referring to the operation of hydro jetting guns in which there is a safety system, additionally described in the present invention.

Additionally, the present invention also comprises a safety method for hydro jetting guns, comprising the assembly phase on the hydro jetting gun and the operation phase of this hydro jetting gun, applicable to the system 100 described above. In particular, said method and its phases can include at least the steps of:

Phase 1—Assembling the Hydro Jetting Gun
- Step A) Installation of the pressure and power box
- Step B) Installation of the gun adaptation assembly
- Step C) Interconnection between the pressure and power box and the gun adaptation assembly Phase 2—Operation of the Hydro Jetting Gun
- Step D) User registration
- Step E) Dry testing
- Step F) Hydraulic connection
- Step G) Hydraulic testing
- Step H) Connection of the system
- Step I) Release for operation
- Step J) Safety monitoring
- Step K) Safety blocking FIGS. 9 and 10 are representative flowcharts of the invention, with relation to said safety system and method, respectively, for hydro jetting guns.

As particularly shown in FIG. 9, Step A) can include physically installing the solenoid valve 7 in the pressure and power box 2 (902), physically installing the junction box 6 in the pressure and power box 2 (904), and physically installing the display 5 in the pressure and power box 2 (906). Step A) can further include interconnecting the display 5 and the solenoid valve 7 by wire via the junction box 6 (908).

Step B), in turn, can include physically installing the double trigger mechanism 8, with the adaptations provided for in this invention, in the gun adaptation assembly 1 (910), physically installing the microcontroller 9 in the gun adaptation assembly 1 (912), and interconnecting the double trigger mechanism 8 to the microcontroller 9 by wire (914).

Step C) can include interconnecting the microcontroller 9 to the display 5 by wire via the junction box 6 (916).

As particularly shown in FIG. 10, Step D) can include registering the wearable 4 in the operational environment (1002), registering the gun in the operational environment (1004), turning the wearable on and delivering it to the user (1006), and linking the wearable, user, and gun in the operational environment (1008).

Turning back to FIG. 9, in Step E), a dry test of the system is performed (918). The system is then checked to see if it is operating (920). If not, the various connections made in Steps A)-C) are reviewed (922). If so, the method proceeds to Step F), below.

Step F) can include making connections to the hydraulic lines to be used (924).

Step G) can include testing the hydraulic connections (926). The hydraulic connections are tested to see if they pass one or more tests (928). If they do not pass, the hydraulic connections are reviewed (930). If they do pass the test(s), the equipment is ready to use in operation (932).

Turning back to FIG. 10, in Step H), the system is finally energized (1010), and a light indicating operation may be activated (1012). The light is checked to make sure it activated (1014). If it did not, the various connections and installations described above can be checked (1016).

In Step I), the system is released for operation (1018), so that the actuation of the two triggers of the double trigger system 8 releases the hydro jetting operation (1020). The system is configured to continuously check to see if the user is performing the hydro jetting operation (1022) and remains in a ready state.

Step J) comprises a series of safety monitoring procedures (1024), as listed below:

Monitoring of the gun movement conditions using the inertial measurement sensors 3;

Monitoring of the actuation conditions of the double trigger mechanism 8;

Monitoring of the hydro jetting activity time, and

Monitoring of the user in activity using the wearable 4.

Finally, Step K) comprises a series of safety blocking possibilities, immediately activated upon the system recognizing a dangerous situation or a deviation from the predefined standards and monitored in Step J) (1026). If no dangerous situation is recognized, the system will continue to monitor activity to determine when the activity has ended (1028) such that the system can either continue conducting the safety monitoring procerus (1024), or can end. The safety blocking possibilities described above can include:

Automatic interlocking of the water flow, using the solenoid valve 7, in the event of a movement out of the standard detected by the inertial measurement sensors 3;

Automatic interlocking of the water flow, using the solenoid valve 7, in the event of de-actuation of one of the triggers of the double trigger mechanism 8;

Automatic interlocking of the water flow using the solenoid valve 7, if the activity time limit is exceeded, and/or Automatic interlocking of the water flow, using the solenoid valve 7, in the event of loss of communication between the wearable 4 and the gun adaptation assembly 1 (1030).

The system continues to monitor activity to determine if and when the dangerous situation has ended (1032). If the dangerous situation has ended, the user can return to performing the hydro jetting activity (1020); however, if the dangerous situation has not ended, the system will maintain the safety blocking possibilities (1034), as discussed above.

The present invention is described herein in terms of one or more embodiments, and it should be understood that modifications can be made to the matter described herein, such modifications still being included in the set of component claims of this description.

The invention claimed is:

1. A safety system for hydro jetting guns configured to monitor and interrupt a hydro jetting operation depending on movements detected out of predefined operating limits, the safety system comprising:

a gun adaptation assembly interconnected to a pressure and power box, and comprising at least two inertial measurement sensors, a support with a gun microcontroller, and a double trigger mechanism, wherein the pressure and power box comprise a junction box and a solenoid valve; and a user monitoring wearable.

2. The safety system of claim 1, wherein the movements detected out of predefined operating limits comprise deviations of parameters that indicate one or more of malfunction, excessive working hours, discomfort of an operator, or combinations thereof.

3. The safety system of claim 1, wherein the gun adaptation assembly is interconnected to the pressure and power box via one or more wires, and wherein both the gun adaptation assembly and the pressure and power box comprise metallic material.

4. The safety system of claim 1, wherein the gun adaptation assembly is interconnected to the user monitoring wearable via a wireless connection.

5. The safety system of claim 1, wherein the pressure and power box further comprises an information display.

6. The safety system of claim 1, wherein the gun adaptation assembly is attached to one or more hydro jetting guns via at least three gripping components, the one or more hydro jetting guns comprising a longitudinal extension having a first length, and wherein the at least three gripping components are configured to embrace the entire first length of the longitudinal extension.

7. The safety system of claim 1, wherein the at least two inertial measurement sensors are connected to the gun microcontroller via one or more wires, and wherein the at least two inertial measurement sensors comprise gyroscopes and accelerometers.

8. The safety system of claim 1, wherein the gun microcontroller is configured to store one or more control instructions for one or more actions of the system, and wherein the one or more actions comprise one or more of parameters, start of operation, stop of operation, display of information, or combinations thereof.

9. The safety system of claim 5, wherein the junction box is configured to distribute electrical energy to power the solenoid valve and the information display, and the solenoid valve is configured to release a flow of compressed air to activate the hydro jetting operation, wherein the solenoid valve is powered by 24 V direct voltage, with a pressure of between approximately 2 and 8 bar (200 and 800 kPa), and the solenoid valve comprising one or more dimensions configured to allow its accommodation in the pressure and power box, and wherein the junction box is configured to allow its coupling to the pressure and power box and its accommodation in the pressure and power box.

10. The safety system of claim 1, wherein the double trigger mechanism comprises two triggers and determines the hydro jetting operation only by pressing the two triggers simultaneously, and wherein the double trigger mechanism further comprises, in each of the two triggers, both pneumatic and electrical driving.

11. The safety system of claim 1, wherein the user monitoring wearable comprises one or more heart rate detection sensors powered by a battery.

12. The safety system of claim 1, wherein the user monitoring wearable comprises one or more first sensors that, when added to the at least two inertial measurement sensors, are read and recognized by the gun microcontroller, and wherein the gun microcontroller communicates one or more necessary actions to the pressure and power box.

13. The safety system of claim 1, wherein the safety system externalizes data relating to an operational environment via a wireless connection through an arrangement and configuration of a wireless connection module in the gun microcontroller.

14. A safety method for hydro jetting guns using the safety system of claim 1, the safety method comprising:

assembling a hydro jetting gun by:

Step A) installing the pressure and power box;

Step B) installing the gun adaptation assembly; and

Step C) connecting the pressure and power box and the gun adaptation assembly; and operating the hydro jetting gun by:

Step D) registering a user;

Step E) dry testing the hydro jetting gun;

Step F) hydraulically connecting the hydro jetting gun;

Step G) hydraulically testing the hydro jetting gun;

Step H) connecting the safety system;

Step I) releasing the hydro jetting gun for operation;

Step J) conducting safety monitoring of the hydro jetting gun; and

Step K) conducting safety blocking.

15. The method of claim 14, wherein Step A) comprises physically installing the solenoid valve, the junction box, and a display in the pressure and power box, and interconnecting the display and the solenoid valve to the junction box via one or more wires.

16. The method of claim 14, wherein Step B) comprises physically installing the double trigger mechanism in the gun adaptation assembly, physically installing the gun microcontroller in the gun adaptation assembly, and interconnecting the double trigger mechanism to the gun microcontroller by one or more wires.

17. The method of claim 14, wherein Step C) comprises interconnecting the gun microcontroller to a display by wire via the junction box.

18. The method of claim 14, wherein Step D) comprises registering the wearable, defining a user and the gun in an operating environment, and, responsive to registering the wearable, turning the wearable on and placing it on the user.

19. The method of claim 14, wherein Step J) comprises one or more safety monitoring procedures comprising one or more of monitoring gun movement conditions using the at least two inertial measurement sensors, monitoring activation conditions of the double trigger mechanism, monitoring hydro jetting activity time, monitoring the user in activity using the wearable, or combinations thereof.

20. The method of claim 14, wherein Step K) comprises one or more safety blocking possibilities that are immediately activated upon deviation from one or more predefined patterns and monitored in Step J), and wherein the one or more safety blocking possibilities comprise one or more of automatically interlocking of water flow, using the solenoid valve, when the at least two inertial measurement sensors detect a movement out of a standard; automatically interlocking of the water flow, using the solenoid valve, when one of two triggers of the double trigger mechanism are turned off; automatically interlocking of the water flow, using the solenoid valve, if an activity time limit is exceeded; automatically interlocking of the water flow, using the solenoid valve, if a connection between the wearable and the gun adaptation assembly is lost; or combinations thereof.

* * * * *